US008558166B2

(12) United States Patent
Jiang et al.

(10) Patent No.: US 8,558,166 B2

(45) Date of Patent: Oct. 15, 2013

(54) METHOD FOR DETERMINING BORON ISOTOPIC COMPOSITION BY PTIMS—STATIC DOUBLE COLLECTION

(75) Inventors: Shaoyong Jiang, Nanjing (CN); Haizhen Wei, Nanjing (CN)

(73) Assignee: Nanjing University (CN)

( * ) Notice: Subject to any disclaimer, the term of this patent is extended or adjusted under 35 U.S.C. 154(b) by 0 days.

(21) Appl. No.: 13/147,636

(22) PCT Filed: Jan. 27, 2011

(86) PCT No.: PCT/CN2011/070700

§ 371 (c)(1), (2), (4) Date: Aug. 3, 2011

(87) PCT Pub. No.: WO2012/051813

PCT Pub. Date: Apr. 26, 2012

(65) Prior Publication Data

US 2013/0193319 A1 Aug. 1, 2013

(30) Foreign Application Priority Data

Oct. 18, 2010 (CN) .......................... 2010 1 0509775

(51) Int. Cl.
*B01D 59/44* (2006.01)
*H01J 49/00* (2006.01)

(52) U.S. Cl.
USPC ............. 250/282; 250/288; 250/281; 420/14; 420/64; 420/121; 420/431; 423/276; 423/298; 148/302

(58) Field of Classification Search
USPC .............. 250/288, 282, 281; 420/14, 64, 121, 420/431; 423/276, 298; 148/302
See application file for complete search history.

(56) References Cited

U.S. PATENT DOCUMENTS 4,775,453 A * 10/1988 Suzuki et al. ............ 204/157.22
5,265,135 A * 11/1993 Impink et al. ................. 376/328
5,925,313 A * 7/1999 Kajihara et al. .............. 420/528
7,125,515 B2 * 10/2006 Aruga et al. .................. 420/528

* cited by examiner

*Primary Examiner* — Nikita Wells

(74) *Attorney, Agent, or Firm* — Schmeiser, Olsen & Watts LLP

(57) ABSTRACT

A method for determining boron isotopic composition by PTIMS (Positive Thermal Ionization Mass Spectrometry)-static double collection realizes simultaneous static collection of m/e309 peak and m/e308 peak by double Faraday cups through adjusting the two parameters Focus Quad and Dispersion Quad in Zoom Optics, and completes high-accuracy determination of boron isotopic composition. The method includes (1) determining Focus Quad and Dispersion Quad parameters in the Zoom Optics of the ion source; (2) determining the two parallel cups in the Faraday collector and their parameters; (3) determining the collection mass number of the center cup of the Faraday collector. The method of the present invention establishes a method for determining boron isotopic composition by static collection with double Faraday cups under the condition of not changing high voltage parameters and Faraday cup hardware setting, greatly shortens data acquisition time compared to the dynamic peak jumping method, and improves the sensitivity and internal and external accuracy of the determination of boron isotopic composition by PTIMS.

4 Claims, 5 Drawing Sheets

METHOD FOR DETERMINING BORON ISOTOPIC COMPOSITION BY PTIMS—STATIC DOUBLE COLLECTION

FIELD OF TECHNOLOGY

The following pertains to the field of mass-spectrometric technique and relates to a method for determining boron isotopic composition, particularly to a method for accurately determining boron isotopic composition by simultaneously collecting $^{133}Cs_2{}^{11}B^{16}O_2^+$ ion (m/e=309) and $^{133}Cs_2{}^{10}B^{16}O_2^+$ ion (m/e=308) using two Faraday Cups.

BACKGROUND

In the nature, boron isotope ($\delta^{11}B$) varies in a large range and the isotopic composition of boron differs significantly in different environmental and geological process. For this reason, boron isotopic composition is widely applied in the fields of crust-mantle evolution, mineral deposits, hydrochemistry, environmental geochemistry, marine environment and paleoenvironment. With the improvement in the determination methodology and analyzing accuracy, boron isotope as a sensitive and reliable indicator has been employed in various scientific fields, paleooceanography, paleoenvironment, environmental monitoring, pollution sources identification etc. Boron isotope is the most promising tools in the research field of geochemistry in the recent two decades.

Due to the remarkable indicative significance of boron isotopic composition for the changes of environmental and geological processes, the purification-separation procedure and the analytical methods for boron isotopes have been significantly developed and improved to deal with natural samples with rich organic matter, complex matrix and low boron content.

At present, the mass-spectrometric (MS) techniques for determining boron isotopic composition mainly include Positive Thermal Ionization Mass Spectrometry ($Cs_2BO_2^+$-PTIMS), Negative Thermal Ionization Mass Spectrometry ($BO_2^-$-NTIMS), Inductively-Coupled-Plasma Mass Spectrometry (ICP-MS), Multi-Collector Inductively-Coupled-Plasma Mass Spectrometry (MC-ICP-MS) and Secondary-Ionization-Mass-Spectrometry (SIMS). The main features and research progress of these determination methods has been compared as shown in Table 1 (Aggarwal J. K. et al., Precise and accurate determination of boron isotope ratios by multiple collector ICP-MS: origin of boron in the Ngawha geothermal system, New Zealand, Chemical Geology, 2003, 199, 331-342).

Because of some inherent disadvantages related to different measurement techniques, such as, relatively large quantity of boron required for PTIMS, larger measurement uncertainty for NTIMS, higher random errors for ICP-MS, poor internal precision and crucial dependence on sample matrix for SIMS (Jugdeep K. et al. Boron Isotope Analysis A Review, Analyst, 1995, 120, 1301-1307, Hemming N. G., Hanson G N., Boron isotopic composition and concentration in modern marine carbonates. Geochimica et Cosmochimica Acta, 1992, 56, 537-543). there is no any single instrument could satisfy the determination of boron isotopic composition for all kinds of sample. The accurate determination of boron isotopic composition in the natural samples with low boron content, complex composition and rich organic and biological matters is still a big challenge. In mineral resource and eco-environmental chemistry fields, boron isotopic composition is used to trace the origin of ore formation, pH change of seawater, $CO_2$ concentration in atmosphere, climatic evolution, changes of sea level, and origin and evolution of salt lakes, but ICP-MS method can not be used in these studies as an accurate method because the obtained $^{11}B/^{10}B$ ratio has a low accuracy. Therefore, the determination of boron isotopic composition in natural samples mainly adopts PTIMS & NTIMS and MC-ICP-MS methods.

TABLE 1

Comparison of various MS techniques for determination of boron isotopic composition

| MS technique | Pre-treatment | Sample size | Accuracy (‰) | Advantage | Dis-advantage |
|---|---|---|---|---|---|
| MC-ICP-MS | Complete separation | 250 ng | ±0.2 | Small sample size, high accuracy and high analysis speed | Expensive instruments |
| HR-ICP-MS | No | 250 ng | ±2 | High analysis speed and no need of pre-treatment | Low accuracy, and serious memory effect |
| Quad-ICP-MS | No | 100 ng | ±14 | High analysis speed | Extremely low determination accuracy |
| LA-MC-ICP-MS | No | Nano-gram level | <1 | In-situ analysis of solid sample | Instrument fractionation and drift |
| PTIMS | Complete separation | 1 μg | ±0.4 | High accuracy | High sample purity and long time |
| NTIMS | Need pre-treatment | 10 ng | ±0.8 | Small sample size | Low accuracy |
| SIMS | No | | ±4 | In-situ analysis of solid sample | Inability to analyze liquid and vapor phase |

At present, the method of $Cs_2BO_2^+$-graphite-PTIMS is well employed by many laboratories in the world, which first was introduced by Y K. Xiao et al (Y. K. Xiao, Beary E S, Fassett J D. Int. J. Mass Spectrom. Ion. Proc. 85 (1988)203) who found the intensity of $Cs_2BO_2^+$ emitted from $Cs_2B_4O_7$ can be increased to 2-orders of magnitude and when loading graphite on the filament in TIMS. During instrumental determination, a single central Faraday cup is used to collect m/e309 and m/e308 ions in the mode of peak jumping (i.e. dynamic single-collection method). According to Equation (Eq 1), the boron isotopic ratio $^{11}B/^{10}B$ is obtained based on 309/308 ratio. It is estimated as one of the best methods for the determination of boron isotopic composition with the highest precision of 0.1‰ (1σ) at the optimal condition (K. Jugdeep et al.).

$$^{11}B/^{10}B=R_{309/308}-0.00079 \quad \text{(Eq 1)}$$

However, this method has considerable limitations in the determination of natural samples with low boron content. Its remarkable defects include: (1) Under the condition of low boron content (<1 μg), $Cs_2BO_2^+$ ions can hardly maintain steady emission and are highly prone to decay in a short time; (2) The data acquisition in the mode of dynamic peak jumping is slow, and the ion signal has attenuated completely before completing 10 Cycles/10 Block 100 data acquisition for a single sample. Moreover, during dynamic data acquisition, when the magnetic field of mass spectrometer jumps to peak 308 (referring to the peak of $Cs_2BO_2^+$ ion with m/e 308 in this Description) after data acquisition of peak 309 (referring to the peak of $Cs_2BO_2^+$ ion with m/e 309 in this Description), the ion intensity has been changed and the provided 309/308 ratio is not true. As a result, the determined $^{11}B/^{10}B$ ratios deviate from the true value.

Many researchers have tried for long time to use simultaneous static collection of peak 309 and peak 308 to improve the precision for determining boron isotope ratio by TIMS-dynamic jumping of peak 309 and peak 308. They face the following major technical difficulties: (1) As the mass to charge ratio (i.e. m/e) of $Cs_2BO_2^+$ ions is large (m/e=308 and 309), the separation of the two ions needs a larger radius of sector magnetic field in the mass spectrometer according to the equation for deflection of charged ions by magnetic field in the mass spectrometer (Eq 2); (2) When the ratio of peak 309 and peak 308 of $Cs_2BO_2^+$ ions is collected to determine $^{11}B/^{10}B$, the gap between the two parallel Faraday cups in order to full collection of m/e 309 ion and m/e 308 ion must be very small as the relative mass difference of the two detected ions is very small, only 0.0032 as obtained from Equation (Eq 3). In the recent years, the newly developed TIMS instruments have greatly improved the ionization efficiency of ion sources, the determination accuracy and sensitivity of isotopic ratio and the update of instrument control hardware and data analysis software, but it does not have much improvement in mass dispersion and is still unable to use the Faraday cups provided for commercial TIMS instruments to conduct simultaneous full double-collection determination of m/e 309 ($^{133}Cs_2{}^{11}B^{16}O_2^+$) m/e 308 ($^{133}Cs_2{}^{10}B^{16}O_2^+$) ions under normal condition.

$$R = \sqrt{\frac{2U}{H^2} \times \frac{m}{e}} \qquad \text{(Eq 2)}$$

Where: R is ion deflection radius; U is electric field voltage; H is magnetic field strength.

$$\Delta m = \frac{m_2 - m_1}{m} = \frac{1}{309} = 0.0032 \qquad \text{(Eq 3)}$$

To solve these technical problems, the general method for the TIMS instruments which may adjust high voltage is to reduce the deflection radius of $Cs_2BO_2^+$ ions with a very large mass charge ratio in the sector magnetic field through reducing the high voltage of the ion source accelerator (for example, reducing from the set of 10.0 kV to 8.0 kV, or from the set of 8.0 kV to 5.5 kV), and increase the flight dispersion angle of m/e 309 and m/e 308 ions, and apply simultaneous collection of m/e 309 and m/e 308 ions through adjusting the two parallel Faraday cups (A. Deyhle, Improvements of boron isotope analysis by positive thermal ionization mass spectrometry using static multicollection of $Cs_2BO_2^+$ ions. International Journal of Mass Spectrometry, 2001, 206, 79-89). For the newly developed TIMS instrument, the manufacturer might fix two parallel cups seamlessly during assembly of Faraday cup collector hardware with special requirements of scientific research to achieve simultaneous collection of the two m/e 309 and m/e 308 ions.

However, the current two methods that might perform the simultaneous collection stressed above are limited to specific models or special TIMS instrument and are not universally applicable. When the above techniques are applied on other TIMS instruments, they appear the following limitations: (1) Some models of TIMS can not change the high voltage of the ion source accelerator through instrument control software and operation panel and can not apply static multi-collection determination through reduction of high voltage; (2) As for the instrument with two Faraday cups fixed together by the manufacturer, the distance between the fixed Faraday cups is unadjustable. This also limits the application of the fixed group of Faraday cups group when it collects the detected ions during determination of the isotopes of other elements.

To solve this problem, The present invention increases the flight deflection angle of m/e 309 and m/e 308 ions in the ion flight channel through adjusting and changing the parameters of Zoom Optics in TIMS according to the focusing principle of the ion source of the mass spectrometer, and meanwhile select the two cups with the largest deflection angle, set their distance and simultaneously collect the two ions. After optimizing the two parameters of Focus Quad and Dispersion Quad in Zoom Optics, the perfect shape and full superposition of peak 309 and peak 308 are achieved after setting a mass number for the center cup of the Faraday collector. The method of the present invention successfully establishes accurately determination of boron isotopic composition by PTIMS-double Faraday cup static collection without changing high voltage parameters and Faraday cup hardware setting conditions.

SUMMARY

One aspect relates to providing a high-precision method for determining boron isotopic composition by PTIMS-static double collection, solving the technical problem encountered by the method for determination of boron isotopic composition by PTIMS-$Cs_2BO_2^+$-static double collection during simultaneous and full collection of $Cs_2BO_2^+$ ions with a large mass charge ratio (m/e=309 and 308), such as the failure to adjust the high voltage of the ion source, the poor flexibility of two manually fixed parallel Faraday cups, and the instability of signals and other limitations. The invention applies simultaneous collection of m/e 309 and m/e 308 ions by two Faraday cups through adjusting Zoom Optics parameters according to the lens focusing principle of the ion source of the mass spectrometer, and establishes a method for accurately determining boron isotopic composition by static collection.

The method established by the present invention for determining boron isotopic composition by PTIMS-static double collection includes the following steps:

(1) Selecting two parallel Faraday cups with the largest deflection angle in the Faraday collector to collect m/e 309 and m/e 308 boron isotope ions, respectively, and setting cup distance as the minimum value;

(2) Adjusting Focus Quad and Dispersion Quad parameters in Zoom Optics of the ion source till the following conditions are satisfied:
   - (i) After optical focusing and deflection, m/e309 and m/e308 boron isotope ions can be fully collected in the two selected Faraday cups;
   - (ii) The peaks of the two ions are well-defined flat peaks without tailing peaks and prepeaks;
   - (iii) The peaks of the two ions are fully overlapped;

(3) Adjusting the collection mass number of the center cup of the Faraday collector till the following conditions are satisfied:
   - (i) In this mass number, no ion peak appears for the center cup. In other words, it is a baseline during data acquisition of the instrument;
   - (ii) After optical focusing and deflection, m/e309 and m/e308 boron isotope ions can be fully collected in the two selected Faraday cups, and the center positions of the peaks are not shifted;

(4) Scanning the ion peaks, checking the peak centers and starting the data acquisition and measurement program to determine boron isotopic composition of the samples.

In order to achieve the object of the present invention, apply simultaneous static collection of peak 309 and peak 308 by double Faraday cups on PTIMS, and complete accurate determination of boron isotopic composition, the present invention spurns previous regular approaches to apply static collection of boron isotope on TIMS by adjusting the high voltage of the instrument or changing the hardware setting of Faraday cups mechanically. It proceeds from the theory for change of ion deflection angle in Zoom Optics of a mass spectrometer. Through adjusting the focusing parameters of TIMS, the present invention achieves a simultaneous collection of the two boron ions with large mass charge ratio in the selected parallel Faraday cups. For this object, the method of the present invention, or in other words, the technical problems it must solve include: (1) searching two parameters (Focus Quad and Dispersion Quad) in Zoom Optics of the ion source; (2) selecting two parallel cups in the Faraday collector and setting cup parameters; (3) determining the collection mass number of the center cup of the Faraday collectors.

As shown in FIG. 1, the three technical parameters contained in the method of the present invention are interdependent, and the three steps in the technical process for the establishment of the method of the present invention are as following: determining parallel Faraday cups, determining Zoom Optics parameters, and determining the collection mass number of the center cup.

In order to improve the model of signal collection from ion peak jumping (i.e. dynamic single-collection method) into simultaneous collection of peak 309 and peak 308 (double-cup static collection method) in TIMS, the first step is to select two parallel Faraday cups and set their position parameters. Typically, the two parallel Faraday cups selected in TIMS are: (A) combination of a center cup (cup C) and an adjacent cup (cup H1), (B) combination of the two cups with the largest deflection angle (cup H3 and cup H4). As described above, as the relative mass difference of the two detected ions is very small, cup H1 still is unable to fully collect $^{133}Cs_2{}^{11}B^{16}O_2{}^+$ (m/e=309) ions with a large mass charge ratio under the condition that $^{133}Cs_2{}^{10}B^{16}O_2{}^+$(m/e=308) ions can be fully collected by cup C when combination A is adopted, even if the distance between the two cups is set as the critical minimum value in the instrument. In other words, compared with the signal of m/e 308 collected by cup C, that of m/e 309 can not be fully collected by cup H1 if ion intensity is low. Considering that the mass charge ratios of the peak of $^{133}Cs_2{}^{11}B^{16}O_2{}^+$(m/e=309) ion and the peak of $^{133}Cs_2{}^{10}B^{16}O_2{}^+$(m/e=308) ion are large, in accordance with the law of ions motion in a sector magnetic field, the method of the present invention selects the option of combination B, i.e the two cups with the largest deflection angle (cup H3 and cup H4). Cup H3 and cup H4 are the parallel cup group for collection of the two ions and the distance between the two cups is set as the minimum value realizable by the instrument.

The method of the present invention achieves simultaneous and full collection of the ions with a large mass charge ratio in the selected parallel Faraday cups through adjusting TIMS Zoom Optics. The full collection of m/e308 or m/e309 ion is defined as that the ion intensity of m/e 308 and 309 collected by Cup H3 and Cup H4 is the same as the intensity of those ion collected by the central cup under the optimal focusing condition in the ion source. The key steps for establishing the method of the present invention include: the two parameters of Zoom Optics including Focus Quad and Dispersion Quad are selected and optimized to achieve full collection of $^{133}Cs_2{}^{11}B^{16}O_2{}^+$(m/e=309) ion peak and $^{133}Cs_2{}^{10}B^{16}O_2{}^+$(m/e=308) ion peak in H3 and H4 parallel Faraday cups, the peaks are perfect flat peaks, and the peak positions are fully superposed under the determination condition (as shown in FIG. 3). The determination of boron isotopic composition by TIMS-static double collection is achieved by simultaneous collection of the ions with a large mass charge ratio in the selected parallel Faraday cups by easily adjusting Zoom Optic parameters in TIMS without any adjustment on high voltage of instrument or mechanical setting of Faraday cups. Zoom Optics parameters should be selected with satisfying the following conditions: (i) the two ions can be fully collected in the two selected Faraday cups after optical focusing and deflection; (ii) the peak shapes of the two ions are perfect without tailing peaks and prepeaks; and (iii) two peaks are fully superposed after the mass number of cup C is determined. This step involves two parameters Focus Quad and Dispersion Quad. In the method of the present invention, the two parameters are tested by the iterative method and the optimal combination of two parameter values is determined to achieve full superposition of the two ion peaks.

Step (2) gives priority to the iterative method to determine Focus Quad and Dispersion Quad parameters, and further includes the following steps:

(1) Setting Focus Quad parameter $x_1$ and Dispersion Quad parameter $x_2$ as default values;

(2) Setting $x_1$ as default value $x_{1\text{-}0}$, and adjusting $x_2$ by $\Delta x_2$ as a variable (30~50-unit value) within the range of instrument parameter value; checking the peak shapes and peak superposition of the two ions and determining an optimal value $x_{2\text{-}1}$ from the foregoing $x_2$ parameter values;

(3) Setting $x_1$ as minimum value $x_{1min}$, and repeating step (2) to determine an optimal value $x_{2\text{-}2}$;

(4) Setting $x_1$ as maximum value $x_{1max}$, and repeating step (2) to determine an optimal value $x_{2\text{-}3}$;

(5) Comparing the peak shape and peak superposition of the two ions under the condition of the foregoing parameters ($x_{1\text{-}0}$,$x_{2\text{-}1}$), ($x_{1min}$, $x_{2\text{-}2}$) and ($x_{1max}$, $x_{2\text{-}3}$), and determining the combination of the two parameters;

(6) Setting Focus Quad and Dispersion Quad as the parameter values determined at step (5), adjusting the two parameters by 2~5-unit value each time, and checking the peak shapes and peak superposition of the two ions till the optimal parameter values ($x_{1\text{-}optimum}$, $x_{2\text{-}optimum}$) are found.

The method of the present invention is to complete accurate determination of boron isotopic composition. A necessary step is to set the mass number of the center Faraday cup, i.e.: baseline mass number. Two factors should be considered to the setting of the mass number of the center Faraday cup: (i) It is a baseline value of the TIMS instrument under this method and no ion peak appear under this mass number. (ii) The collection mass number of cup C is determined and meanwhile cup H3 and cup H4 can just fully collect peak 308 and peak 309.

In view of the three steps above, the method of the present invention adopts a progressive approach. Firstly, it selects the positions of the two parallel Faraday cups, which are intended to collect m/e 308 ion and m/e 309 ion. After setting the combination of the cups, Zoom Optics parameters are selected by an iterative method to achieve full collection of the two ions. At last, the right mass number for cup C is set to ensure the full overlap of two ion peaks. After setting the foregoing parameters, the programs of data acquisition and data evaluation are conducted. In the end, the accurate determination of boron isotopic composition is completed.

The method of the present invention measured the $^{11}B/^{10}B$ ratio in the standard reference materials of boron isotope (NIST 951) several times in order to guarantee the accuracy. After the foregoing technical parameters are determined on TIMS by the method of the present invention, the technique for determination of boron isotopic composition by TIMS-static double collection is established finally.

The method of the present invention is applicable to the existing positive thermal ionization mass spectrometers, which overcomes the limitations in the adjustment of the accelerating high voltage of the ion source or the setting of Faraday cup hardware. The instrument setting is concise and controllable, and fully achieves the simultaneous collection of the two ions with a large mass charge ratio. Compared with the data acquisition method of dynamic peak jumping, the method established by the present invention for determining boron isotopic composition by PTIMS-$Cs_2BO_2^+$-static double collection significantly reduces data acquisition time and improves the sensitivity and the internal and external precision of the determination of boron isotopic composition by positive thermal ionization method. Compared with the existing dynamic jumping method, the method of the present invention takes 7 minutes to acquire 100 cycles of data in a single determination, only ⅙ of the data acquisition time of the dynamic jumping method. The analysis efficiency is greatly improved. Meanwhile, the static double-collection data acquisition method simultaneously collects the peaks of m/e 309 and 308 ions and the instantaneous fluctuation of $Cs_2BO_2^+$ ion signal will not affect on the determined 309/308 ratio, so the internal/external accuracy and precision of this method during determination of isotope ratio are raised.

Because of its high analysis speed, high sensitivity and high precision, the method of the present invention is particularly applicable to the determination of boron isotopic composition in natural samples with trace amount of boron, such as foraminifers, shells and other biological carbonates, rainwater, river water, lake water, ground water. It provides accurate and reliable data for resource environment and geochemical research using the $\delta^{11}B$ value as an indicator.

Below the method of the present invention is described in details with the supporting drawings. The present invention is not limited by any specific instruments or concrete parameters of the embodiments. Its protection scope is defined in Claims.

DETAILED DESCRIPTION

According to the method of the present invention, the boron isotopic composition in NIST 951 boron isotope standard materials is determined on TIMS (Triton Ti) by static double collection.

Figure 1:
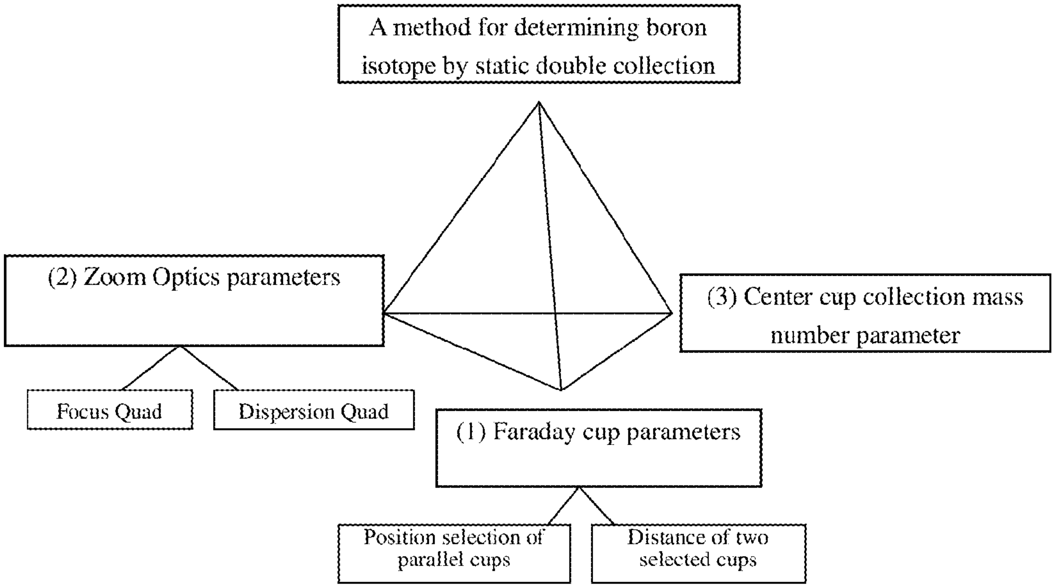
FIG. 1 is a schematic diagram for the principle of the method for determining boron isotopic composition by TIMS-static double collection.
Figure 2:
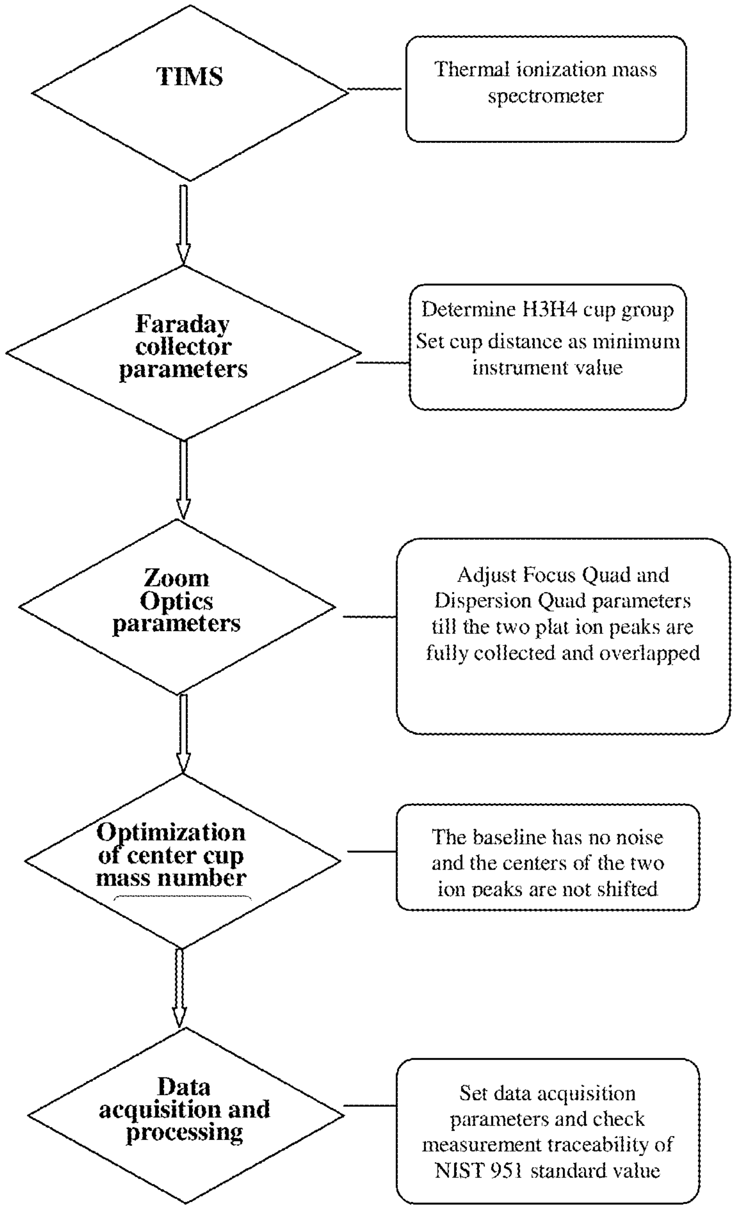
FIG. 2 is a schematic diagram of the method for determining boron isotopic composition by static double collection (PTIMS-$Cs_2BO_2^+$-Static)

As shown in FIG. 2, the method for determining boron isotopic composition by static double collection includes the following steps:

(1) Selecting cup H3 and cup H4 in the Faraday collector to collect m/e309 and m/e308 boron isotope ions, respectively, and setting cup distance as the minimum value available in the instrument;

(2) Adjusting Focus Quad and Dispersion Quad parameters in Zoom Optics of the ion source, and optimizing the parameters by the iterative method till the peaks of $^{133}Cs_2{}^{11}B^{16}O_2^+$(m/e=309) ion and $^{133}Cs_2{}^{10}B^{16}O_2^+$(m/e=308) ion are fully collected by two parallel Faraday cups, Cup H4 and Cup H3, and both two ion peaks are perfect flat peaks without any tailing peak and prepeak and fully superposed.

(3) Determining the collection mass number of cup C in the Faraday collector till instrument baseline has no noise, peak 309 and peak 308 are fully collected and the center positions of the peaks are right;

(4) Performing peak scanning, and data acquisition and data evaluation.

Figure 4:
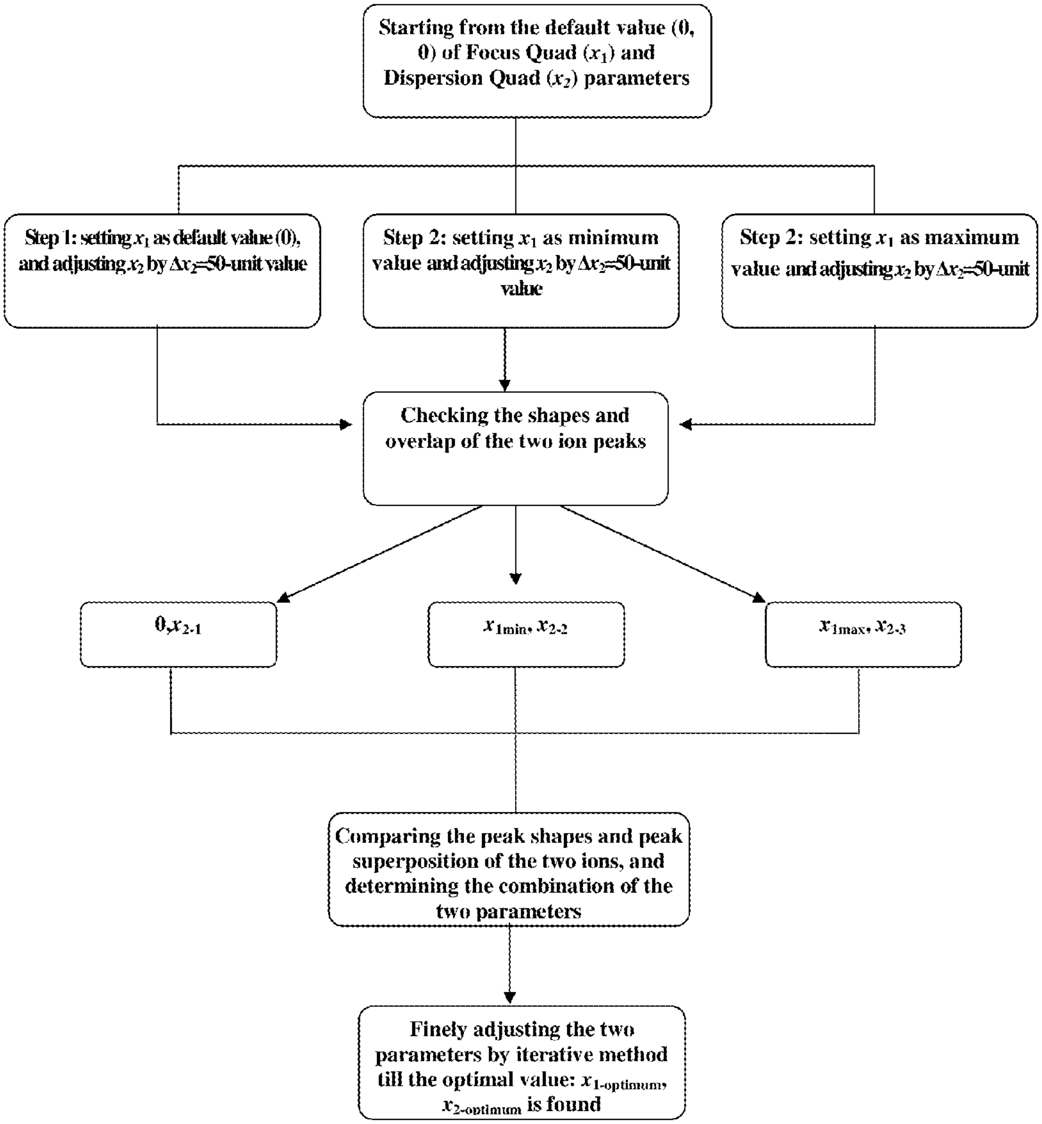
FIG. 4 is a schematic diagram for setting Zoom Optics parameters in the method for determining boron isotopic composition by PTIMS-$Cs_2BO_2^+$-Static.

In the foregoing step (2), parameters are optimized by the iterative method. Its flow chart is shown in FIG. 4 and includes the following steps:

(1) Setting Focus Quad ($x_1$) and Dispersion Quad ($x_2$) parameters as default value (0, 0);

(2) Setting $x_1$ as default value (0), and adjusting $x_2$ within the range of instrument parameter values to $x_2+i\Delta x_2$, wherein i is a natural number and $\Delta x_2$ is a 50-unit value; checking the peak shape and peak superposition of the two ions, and determining an optimal value $x_{2\text{-}1}$ from the foregoing $x_2$ parameter values;

(3) Setting $x_1$ as minimum value (−30), and adjusting $x_2$ within the range of instrument parameter values to $x_2+i\Delta x_2$, wherein i is a natural number and $\Delta x_2$ is a 50-unit value; checking the peak shape and peak superposition of the two ions, and determining an optimal value $x_{2\text{-}2}$ from the foregoing $x_2$ parameter values;

(4) Setting $x_1$ as maximum value (+30), and adjusting $x_2$ within the range of instrument parameter values to $x_2+i\Delta x_2$, wherein i is a natural number and $\Delta x_2$ is a 50-unit value; checking the peak shape and peak superposition of the two ions, and determining an optimal value $x_{2\text{-}3}$ from the foregoing $x_2$ parameter values;

(5) Comparing the peak shape and peak superposition of the two ions under the foregoing three parameter conditions of $(0,x_{2\text{-}1})$, $(x_{1min}, x_{2\text{-}2})$ and $(x_{1max}, x_{2\text{-}3})$, and determining the combination of the two parameters;

(6) Setting Focus Quad ($x_1$) and Dispersion Quad ($x_2$) parameters as the parameter values determined in step (5), adjusting the two parameters by a step of 2~5 units, and checking the peak shape and peak superposition of the two ions till the optimal parameter combination is found.

Figure 5:
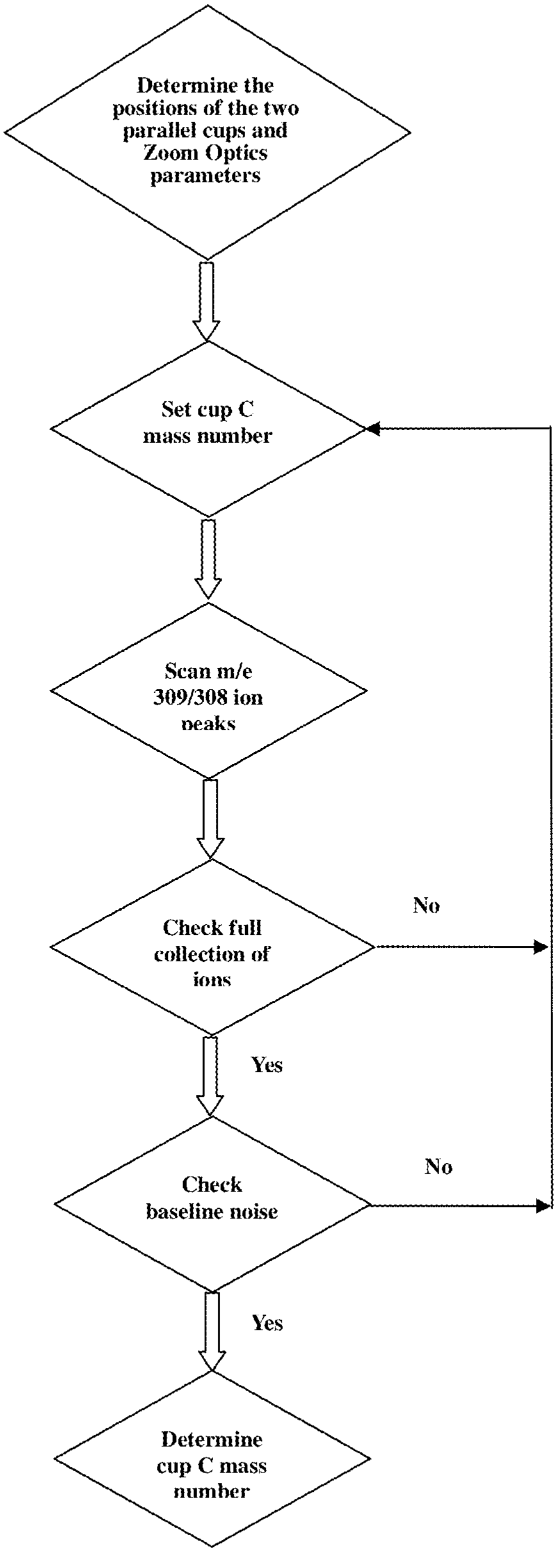
FIG. 5 is a schematic diagram for setting the mass number of center cup in the method for determining boron isotopic composition by PTIMS-$Cs_2BO_2^+$-Static.

In the foregoing step (3), the collection mass number of cup C of the Faraday collector is set according to the following steps as shown in FIG. 5:

(1) Setting cup H3/H4 on instrument control software (Cup Configuration) and adjusting cup distance to the target positions;

(2) Setting a mass number for cup C according to the peak scan diagram;

(3) Scanning peak 308 and peak 309 in cups H3/H4 and checking whether the centers of peak 308 and peak 309 are shifted and whether ions are fully collected; carrying out step (4) if the centers of peak 308 and peak 309 are not shifted and the ions are fully collected; or returning step (2) to reset the mass number of cup C if the foregoing conditions are not satisfied;

(4) Checking noise of the baseline, and defining the set value in step (2) as the mass number of cup C; or returning step (2) to reset the mass number of cup C if the foregoing conditions are not satisfied.

After the foregoing steps, the instrument setting parameters in the method of the present invention are as shown in Table 2. During parameter setting, in order to achieve the full collection of the peaks of $^{133}Cs_2{}^{11}B^{16}O_2{}^+$(m/e=309) ion and $^{133}Cs_2{}^{10}B^{16}O_2{}^+$(m/e=308) ion in H4 and H3 parallel Faraday cups, the peak shape and peak superposition of the two ions are being monitored by means of Peak Scan.

Figure 3:
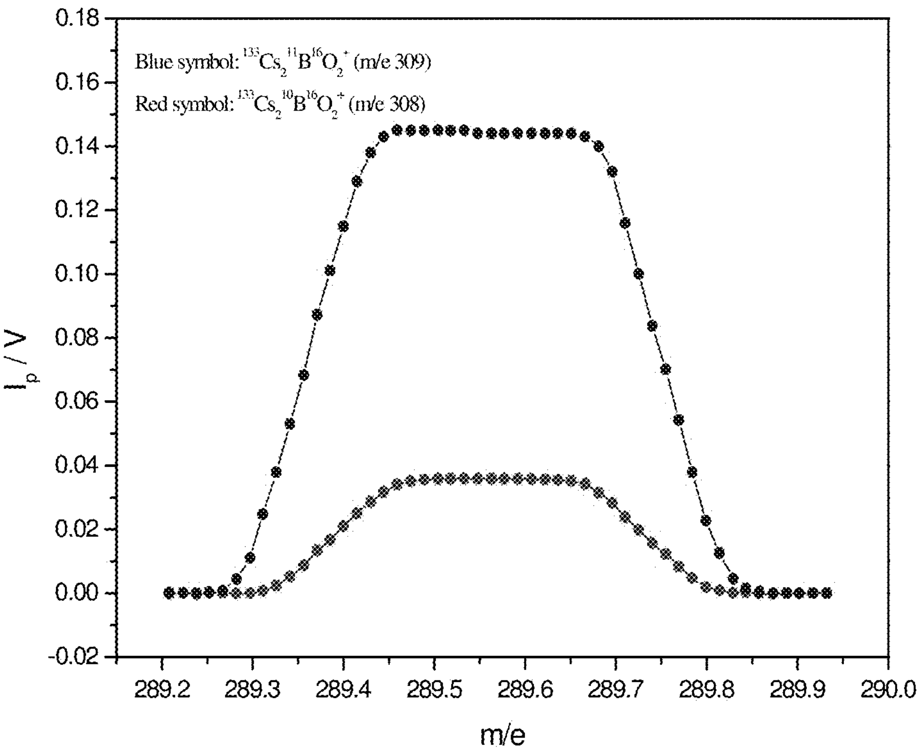
FIG. 3 is a peak scan diagram of the method for determining boron isotopic composition by PTIMS-$Cs_2BO_2^+$-Static.

The peak scan diagram obtained from the method of the present invention for determining boron isotopic composition by PTIMS-$Cs_2BO_2{}^+$-Static is as shown in FIG. 3. Under the setting condition of the method of the present invention, peak 309 and peak 308 have the following features:

(1) Both two peaks are perfect flat peaks without any prepeak and tailing peak;

(2) The two ion peaks are fully superposed, providing convincible technical guarantee for the method to precisely determining boron isotopic composition by PTIMS-$Cs_2BO_2{}^+$-Static;

(3) The determined boron isotopic ratios are around 4, consistent with the abundance ratio of the two isotopes of B in the nature ($^{11}B$ and $^{10}B$), suggesting this method ensures the determination results accurate and will become one of the mainstream methods for high-precision determination of boron isotopic composition.

The comparison of instrument setting parameters and boron isotope ratio between static multi-collection method and dynamic scan method on one same instrument are as shown in Table 2 and Table 3. From Table 2, it is clear that the instrument setting parameters in the method of the present invention is concise and controllable and fully achieves the simultaneous collection of two ions with larger m/e values. Compared with the existing dynamic collection method, the method established by present invention for determining boron isotopic composition with PTIMS-$Cs_2BO_2{}^+$-static multi-collection takes 7 minutes to acquire 100 cycles of data in a single determination, only ⅙ of the data acquisition time of the dynamic jumping method. The analysis efficiency is greatly improved. Meanwhile, the static double-collection data acquisition method simultaneously collects the peaks of m/e309 and m/e308 ions and the dynamic changes of $Cs_2BO_2{}^+$ ion flow signal will not affect on the determined 309/308 ratio, so the internal/external accuracy and precision of this method during determination of isotope ratio has been improved significantly.

TABLE 2

Comparison between PTIMS-$Cs_2BO_2{}^+$-static multi-collection method and dynamic single-collection method in instrument parameters for determination of boron isotopic composition

| Main parameter | | PTIMS-$Cs_2BO_2{}^+$-Static | PTIMS-$Cs_2BO_2{}^+$-Dynamic |
|---|---|---|---|
| Faraday collector parameters | Selection of Faraday cups | Combination of cup H3 and cup H4 | Cup C (Central Cup) |
| | Positions of the target cups | H3-F (308): 89.236<br>H4-F (309): 99.000 | |
| | Mass number of cup C | 289.9 | 309.0 |
| | Data acquisition method | Static double collection | Dynamic jumping single collection |
| Zoom Optics parameters | Focus Quad/V | 15 | 0 |
| | Dispersion Quad/V | −85 | 0 |
| 100 Cycles data acquisition time/min | | 7 | 60 |

Table 3 is the data comparison result between PTIMS-$Cs_2BO_2{}^+$-Static established by the present invention and conventional PTIMS-$Cs_2BO_2{}^+$-Dynamic when they are used to determine boron isotopic composition in boron isotope standard materials NIST 951 in different sample size. From the table, it clearly shows that:

(1) During determination of boron isotopic composition in the samples at microgram level, the 309/308 ratio determined by PTIMS-$Cs_2BO_2{}^+$-Static is same as the ratio determined by conventional PTIMS-$Cs_2BO_2{}^+$-Dynamic. After correction with $^{17}O$ (Eq 1), the obtained NIST 951 boron isotopic composition $^{11}B/^{10}B$ (2σ)=4.0501±0.0003, in a good agreement with the current $^{11}B/^{10}B$ 4.0506±0.0003 (Y. K. Xiao, Beary E S, Fassett J D. Int. J. Mass Spectrom. Ion. Proc. 85 (1988)203) and 4.0504±0.0002 (S. Tonarini et al., Chem. Geol. 142 (1997) 129) obtained by international laboratories by PTIMS-$Cs_2BO_2{}^+$. The determination uncertainty is 0.07‰. This comparison result indicates this method fulfills accurate determination of boron isotopic composition.

(2) The comparison result in determination of boron isotopic composition in the samples at nanogram level indicates that the method of PTIMS-$Cs_2BO_2{}^+$-Static is obviously superior to that of PTIMS-$Cs_2BO_2{}^+$-Dynamic in terms of higher internal/external precision, quick data acquisition. The multi-collection also eliminates the instantaneous fluctuation of $Cs_2BO_2{}^+$ ions during determination (signal decay or gain). For samples at the level of 100 ng, the determination accuracy of PTIMS-$Cs_2BO_2{}^+$-Dynamic is worse significantly and the determined ratio is far away from the true value. By contrast, the method of the present invention maintains higher accuracy and meanwhile the determined value of boron isotope is consistent with the values reported by different international laboratories. This method solves the defect that PTIMS is unable to accurately determine boron isotopic composition in natural samples at nanogram level. It achieves the high-accuracy and high-sensitivity determination of boron isotope in different types of natural samples with trace amount of boron, which cannot be fulfilled by PTIMS method in the past.

TABLE 3

Comparison between PTIMS-$Cs_2BO_2^+$-static multi-collection method and dynamic single-collection method in determination of boron isotopic composition in NIST 951 boron isotope standard substance

| Sample size | | PTIMS-$Cs_2BO_2^+$-Static 309/308(2σ) | PTIMS-$Cs_2BO_2^+$0-Dynamic 309/308(2σ) |
|---|---|---|---|
| 1 μg B | Single determination (100 Cycles) | 4.0510 ± 0.0002 | 4.0484 ± 0.0001 |
| | | 4.0505 ± 0.0002 | 4.0516 ± 0.0002 |
| | | 4.0511 ± 0.0001 | 4.0512 ± 0.0002 |
| | Mean value (3 times) | 4.0509 ± 0.0003 | 4.0504 ± 0.0017 |
| 500 ng B | Single determination (100 Cycles) | 4.0483 ± 0.0002 | 4.0473 ± 0.0009 |
| | | 4.0473 ± 0.0006 | 4.0456 ± 0.0009 |
| | | 4.0471 ± 0.0004 | 4.0476 ± 0.0003 |
| | Mean value (3 times) | 4.0476 ± 0.0006 | 4.0468 ± 0.0011 |
| 100 ng B | Single determination (100 Cycles) | 4.0467 ± 0.0008 | 3.9981 ± 0.0103 |
| | | 4.0511 ± 0.0002 | 3.9133 ± 0.0128 |
| | | 4.0464 ± 0.0006 | 3.9133 ± 0.0129 |
| | Mean value (3 times) | 4.0481 ± 0.0026 | 3.9416 ± 0.0489 |

The present invention relates to geochemistry and electronics and establishes a high-accuracy and high-sensitivity method for determining boron isotopic composition by PTIMS-static multi-collection. This method is applicable to three mainstream fields: research of natural sciences (such as: geochemistry, hydrochemistry and mineral resources), environmental engineering and nuclear industry. In the recent twenty years, following the rapid development of the research on boron isotope application in the world, this method will have a broad application prospect in laboratories worldwide.

The invention claimed is:

1. A method for determining boron isotopic composition by PTIMS-static double collection, including the following steps:

(1) Selecting two parallel Faraday cups with a largest deflection angle in a Faraday collector to collect m/e309 and m/e308 boron isotope ions, respectively, and setting a cup distance as a minimum value;

(2) Adjusting Focus Quad and Dispersion Quad parameters in Zoom Optics of an ion source till the following conditions are met:

(i) After optical focusing and deflection, m/e309 and m/e308 boron isotope ions are fully collected in the two selected Faraday cups;

(ii) The peaks of the two ions are flat peaks without tailing peaks and prepeaks;

(iii) The peaks of the two ions are fully overlapped;

(3) Adjusting the collection mass number of the center cup of the Faraday collector till the following conditions are satisfied:

(i) In this mass number, no ion peak appears for the center cup, the mass number is a baseline mass value during data acquisition of the instrument;

(ii) After optical focusing and deflection, m/e309 and m/e308 boron isotope ions are fully collected in the two selected Faraday cups, and the center positions of the peaks are not shifted; and (4) Scanning the ion peaks, checking the peak centers, and initiating the data acquisition and processing program to determine the samples.

2. A method for determining boron isotopic composition by static double collection as in claim 1, wherein: The full collection of m/e308 or m/e309 ion refers to that the ion peak intensity when each peak is collected in a corresponding Faraday cup under the condition of optimal focusing parameters of the lens of the ion source is same as the intensity when it is collected in the center cup.

3. A method for determining boron isotopic composition by static double collection as in claim 1, wherein: step (2) includes the following steps:

(1) Setting Focus Quad parameter $x_1$ and Dispersion Quad parameter $x_2$ as default values;

(2) Setting $x_1$ as default value $x_{1\text{-}0}$, and adjusting $x_2$ by regarding $\Delta x_2$ as a variance value (30~50-unit value) within the range of instrument parameter value; checking the peak shapes and peak overlap of the two ions and determining an optimal value $x_{2\text{-}1}$ from the foregoing $x_2$ parameter values;

(3) Setting $x_1$ as minimum value $x_{1min}$, and repeating step (2) to determine an optimal value $x_{2\text{-}2}$;

(4) Setting $x_1$ as maximum value $x_{1max}$, and repeating step (2) to determine an optimal value $x_{2\text{-}3}$;

(5) Comparing the peak shape and peak superposition of the two ions under the condition of the foregoing parameters ($x_{1\text{-}0}$,$x_{2\text{-}1}$), ($x_{1min}$, $x_{2\text{-}2}$) and ($x_{1max}$, $x_{2\text{-}3}$), and determining the combination of the two parameters; and (6) Setting Focus Quad and Dispersion Quad as the parameter values determined at step (5), adjusting the two parameters by 2~5 unit value each time, and checking the peak shapes and peak overlap of the two ions till the optimal parameter values ($x_{1\text{-}optimum}$, $x_{2\text{-}optimum}$) are established.

4. A method for determining boron isotopic composition by static double collection as in claim 1, wherein: step (3) includes the following steps:

(1) Setting the two parallel Faraday cups with the largest deflection angle under instrument control software and adjusting cup distance to the target positions;

(2) Setting a mass number for cup C according to the peak scanogram;

(3) Scanning peak 308 and peak 309 in the two parallel Faraday cups and checking whether the centers of peak 308 and peak 309 are shifted and whether ions are fully collected; carrying out step (4) if the centers of peak 308 and peak 309 are not shifted and the ions are fully collected; or returning step (2) to reset the mass number of cup C if the foregoing conditions are not met; and (4) Checking noise of the baseline, and defining the set value in step (2) as the mass number of cup C; or returning step (2) to reset the mass number of cup C if the foregoing conditions are not met.

* * * * *